United States Patent [19]
Valentino

[11] Patent Number: 5,953,168
[45] Date of Patent: Sep. 14, 1999

[54] AUTOMATICALLY ADJUSTABLE PASSENGER MIRROR ASSEMBLY FOR A TRAILERED VEHICLE HAVING A MIRROR POSITION FEEDBACK DEVICE

[76] Inventor: Joseph A. Valentino, 230 Sycamore Mills Rd., Media, Pa. 19063

[21] Appl. No.: 09/183,800

[22] Filed: Nov. 2, 1998

Related U.S. Application Data

[60] Division of application No. 08/769,005, Dec. 18, 1996, which is a continuation-in-part of application No. 08/385,448, Feb. 8, 1995, Pat. No. 5,627,688.

[51] Int. Cl.[6] .............................. G02B 5/08; G02B 7/182; B60R 1/06
[52] U.S. Cl. .......................... 359/843; 359/872; 359/877
[58] Field of Search ...................... 359/843, 872, 359/877; 33/264

[56] References Cited

U.S. PATENT DOCUMENTS

| 3,166,630 | 1/1965 | Esslinger . |
| 3,180,395 | 4/1965 | Reed . |
| 3,208,343 | 9/1965 | Prochnow ................................ 359/843 |
| 3,469,901 | 9/1969 | Cook et al. . |
| 3,563,639 | 2/1971 | Bowler . |
| 3,749,480 | 7/1973 | DeWitt et al. . |
| 3,950,080 | 4/1976 | McKee et al. . |
| 4,609,265 | 9/1986 | McKee et al. . |
| 4,679,158 | 7/1987 | Tate . |
| 4,820,032 | 4/1989 | Thompson, Jr. . |
| 5,056,905 | 10/1991 | Jensen . |
| 5,132,851 | 7/1992 | Bomar et al. . |
| 5,196,965 | 3/1993 | Lang et al. . |
| 5,249,083 | 9/1993 | Doughtie et al. . |
| 5,627,688 | 5/1997 | Valentino ................................ 359/843 |
| 5,719,713 | 2/1998 | Brown ..................................... 359/843 |
| 5,896,235 | 4/1999 | Valentino ................................ 359/877 |

FOREIGN PATENT DOCUMENTS

| 0 094 817 | 11/1983 | European Pat. Off. . |
| 0 361 166A1 | 9/1989 | European Pat. Off. . |
| 86 10279 | 3/1988 | France . |
| 60-161232 | 8/1985 | Japan . |
| 2 259 064 | 3/1993 | United Kingdom . |
| WO 86/05451 | 9/1986 | WIPO . |
| WO 95/35224 | 12/1995 | WIPO . |

*Primary Examiner*—Ricky D. Shafer
*Attorney, Agent, or Firm*—Finnegan, Henderson, Farabow, Garrett & Dunner, L.L.P.

[57] ABSTRACT

An automatic mirror rotation assembly for a vehicle including a tractor and semi-detached trailer is provided. An elongated arm supporting a rotatable wheel attaches to a support mounted at a selected position on the tractor chassis. The arm is pivoted upward until the wheel contacts the underside of the trailer, and is kept engaged with substantially constant pressure. As the vehicle turns, the rotation of the trailer with respect to the tractor is measured by counting rotations or partial rotations of the wheel against the underside surface of the trailer. A corresponding degree of passenger-side rear view mirror is calculated, and a motor automatically rotates the mirror. A feedback device measures the actual rotation of the mirror and feeds that information back to the assembly.

12 Claims, 7 Drawing Sheets

AUTOMATICALLY ADJUSTABLE PASSENGER MIRROR ASSEMBLY FOR A TRAILERED VEHICLE HAVING A MIRROR POSITION FEEDBACK DEVICE

This is a division of application Ser. No. 08/769,005, filed Dec. 18, 1996, which is a continuation-in-part of 08/385,448, filed Feb. 8, 1995, now U.S. Pat. No. 5,627,688.

BACKGROUND OF THE INVENTION

1. Field of the Invention

The invention relates to an assembly for automatically rotating a vehicle rear view mirror. More specifically, the invention relates both to an assembly for automatically rotating a rear view mirror mounted on a passenger side of a vehicle comprising a tractor hauling or semi-detached trailer, and to the rear view mirror itself.

2. Description of the Related Art

Trailered vehicles are well-known. Referring to FIG. 1, a trailered vehicle 20 comprises a semi-detached trailer 22 mounted to a tractor 24. Trailer 22 is mounted at a hitching point 26, typically referred to as a "fifth wheel," positioned at a rear end 28 of the tractor's chassis 30. The tractor and trailer generally align to define an imaginary axis 32. A passenger-side rear view mirror 34 typically is mounted on a passenger-side door of the tractor, and positioned generally in alignment with the axis 32, so that the driver can see the passenger-side rear corner 36 of the trailer 22. The driver typically adjusts this passenger-side mirror 34 either electrically, or by hand, according to the length of the trailer 22. The above-described relationship is shown in FIG. 1(a), depicting the right hand side as the passenger side, as is common for example in the United States, Canada and continental Europe. The driver's field of vision in the passenger-side mirror is depicted by reference numeral 38.

A problem occurs when the driver enters a turn, either going forward or reversing. As the tractor turns, the trailer pivots with respect to the tractor, forming an angle therebetween. The passenger-side rear view mirror, however, remain stationary. The trailer 22 therefore blocks the field of vision 38, causing the driver to lose sight of the passenger-side rear corner 36 of the trailer, along with any object in the vicinity. This problem is depicted in FIG. 1(b). Tighter turns obviously exacerbate this problem.

The resultant loss of rear visibility creates potentially dangerous situations. Whether driving on winding roads, or attempting to back the trailer into a parking lot or a loading dock, the driver's inability to see other vehicles, persons, or other objects in his passenger-side mirror can result in property damage or more serious accidents.

Reports published in 1994 indicate that out of 330,000 reported truck crashes in the U.S. in 1991, 19.1% (approximately 198,000) of these accidents involved backing, turning, lane-changing, or merging maneuvers by trailered vehicles. These crashes accounted for 1.0% of all fatalities, 10.8% of injuries, and 6.3% of costs for trailered vehicle accidents that year, with total direct monetary losses estimated at over $250 million.

A number of commercially available warning systems exist that give a driver a warning of objects behind his truck during a turn. Despite the desirability of such systems, surveys of professional truck drivers have noted several shortcomings with the available systems. For example, existing devices are not easy to install. Another problem exists with the reliability of the existing systems, including damage to the systems while in use. Another problem is the difficulty of using the existing systems. In short, existing systems to detect and warn drivers of objects behind a truck have limited areas of coverage, provide inconsistent warnings, and rarely are used.

A better solution is to enable the driver to rely on his passenger-side rear view mirror, by providing the mirror with the capability to rotate in response to a vehicle turn. Past attempts to provide such a device have met with limited success, as evidenced by the fact that no such device is in widespread use in the trucking industry.

An automatically adjustable passenger-side rear view mirror assembly is desired for trailered vehicles that is easy to install and operate, and is reliable under normal truck-driving conditions and environments.

Additional objects and advantages of the invention will be set forth in the description which follows, and in part will be obvious from the description, or may be learned by practice of the invention. The objects and advantages of the invention may be realized and obtained by means of the combinations described in the attached claims.

SUMMARY OF THE INVENTION

To achieve the foregoing objects, and in accordance with the purposes of the invention as embodied and broadly described herein, a mirror rotation assembly is provided for a vehicle having a tractor and a pivotally connected semi-detached trailer. The assembly comprises an elongated arm having first and second ends, the first end pivotally mountable to a support on a chassis of the tractor with the arm generally transverse to an axis defined by the tractor and the trailer, and the second end supporting a rotatable wheel. A pivot assembly is configured to pivot the arm from a disengaged position proximate the chassis to an engaged position with the wheel in rolling contact with an underside of the trailer. A counter is provided that is operable to count a number of rotations or partial rotations of the wheel as the trailer pivots with respect to the tractor during a vehicle turn. A motor connects to a rotatable mirror on the tractor. A processor also is provided, programmed to receive the number of wheel rotations or partial rotations from the counter, calculate a degree of vehicle turn corresponding to the number of wheel rotations or partial rotations, calculate a degree of mirror rotation corresponding to the degree of vehicle turn, and instruct the motor to rotate the mirror according to the calculated degree of mirror rotation.

It is also preferred that the mirror include a position feedback device. A housing attaches to a frame of the vehicle mirror to be rotatable with the frame, a fixed shaft of the mirror projecting through the housing. A first pulley is fixedly attached to the fixed shaft. A second pulley rotates with the housing and the mirror frame. A timing belt extends between the two pulleys. A potentiometer is attached to the second pulley and rotates therewith. A cable projects from the potentiometer and attaches to the processor.

A mirror assembly also can be provided with the rotation assembly. Preferably, the mirror assembly includes a frame with clips, and a plurality of interchangeable mirror faces which are held by the clips. It is further preferred that the different mirror faces have varying optical characteristics.

DESCRIPTION OF THE DRAWINGS

Preferred embodiments of the present invention will be described in detail below with reference to the accompanying drawings. Together with the general description given above and the detailed description of the preferred embodiments given below, the drawings serve to explain the principles of the invention.

DESCRIPTION OF THE PREFERRED EMBODIMENTS

Reference will now be made in detail to the presently preferred embodiments of the invention as broadly illustrated in the accompanying drawings.

Figure 1A:
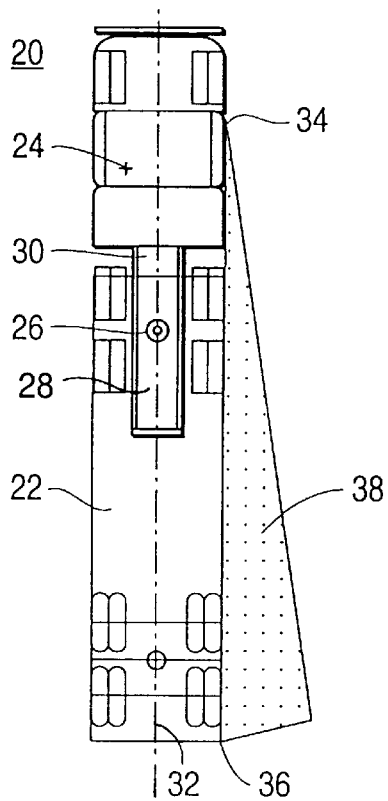
FIG. 1(a) is a top view of a trailered vehicle including a tractor and a semi-detached trailer, depicting the normal field of vision of a passenger-side rear view mirror.
Figure 1B:
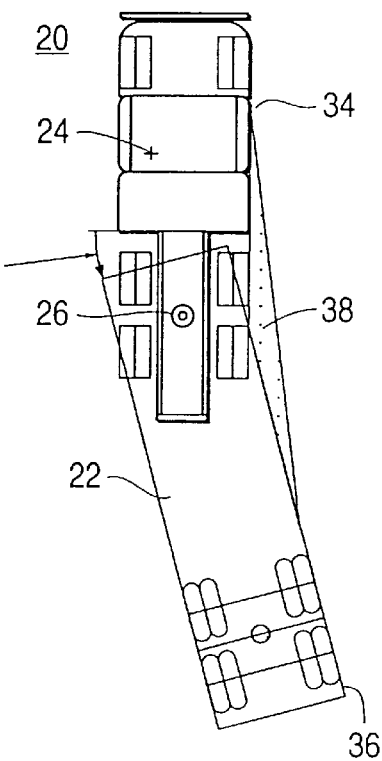
FIG. 1(b) is a top view of a tractor and semi-detached trailer of the prior art, in which the field of vision in the passenger-side rear view mirror is reduced or eliminated during a vehicle turn.

A mirror rotation assembly is provided for a vehicle having a tractor and a pivotally connected semi-detached trailer. Referring to FIG. 1, vehicle 20 includes a trailer 22 which connects pivotally to a tractor 24 at a pivot point 26 commonly known in the trucking industry as the "fifth wheel." The fifth wheel 26 is positioned proximate a rear end 28 of tractor chassis 30. The tractor and trailer align to define an imaginary axis 32. A rear view mirror 34 is provided on the passenger-side door, to provide the driver a field of vision 38, 38a encompassing the passenger-side rear corner 36 of the trailer. The overall configuration of a trailered vehicle, and the attachment between the trailer and the tractor, are well known and will not be described further.

In accordance with the invention, an elongated arm having first and second ends is provided, the first end pivotally mountable to a support on the chassis of the tractor with the arm generally transverse to an axis defined by the tractor and the trailer, the second end supporting a rotatable wheel. As broadly depicted in FIG. 2, a support 40 is attachable to a plurality of positions on the tractor chassis. Preferably, support 40 is a steel cross member 42 mountable to channels 29 in the chassis at a number of selected positions in front of fifth wheel 26, using steel down clamps 44, bolts 46, and neoprene gaskets 48. Clamps 44 preferably are steel clamps. The use of clamps and bolts to secure cross member 42 to chassis 30 allows the driver to loosen the bolts and move the cross-member 42 to the desired position, depending on the particular trailer being towed. One of ordinary skill in the art will recognize that most commercial trailers in the United States have a steel plate with holes in it mounted on the underside of the trailer, either 12 inches or 22 inches in front of the fifth wheel. The position of the cross member 42 on the chassis therefore should be adjustable as necessary to avoid holes in this plate. Neoprene gaskets 48 allow for variations in chassis surfaces.

Figure 2:
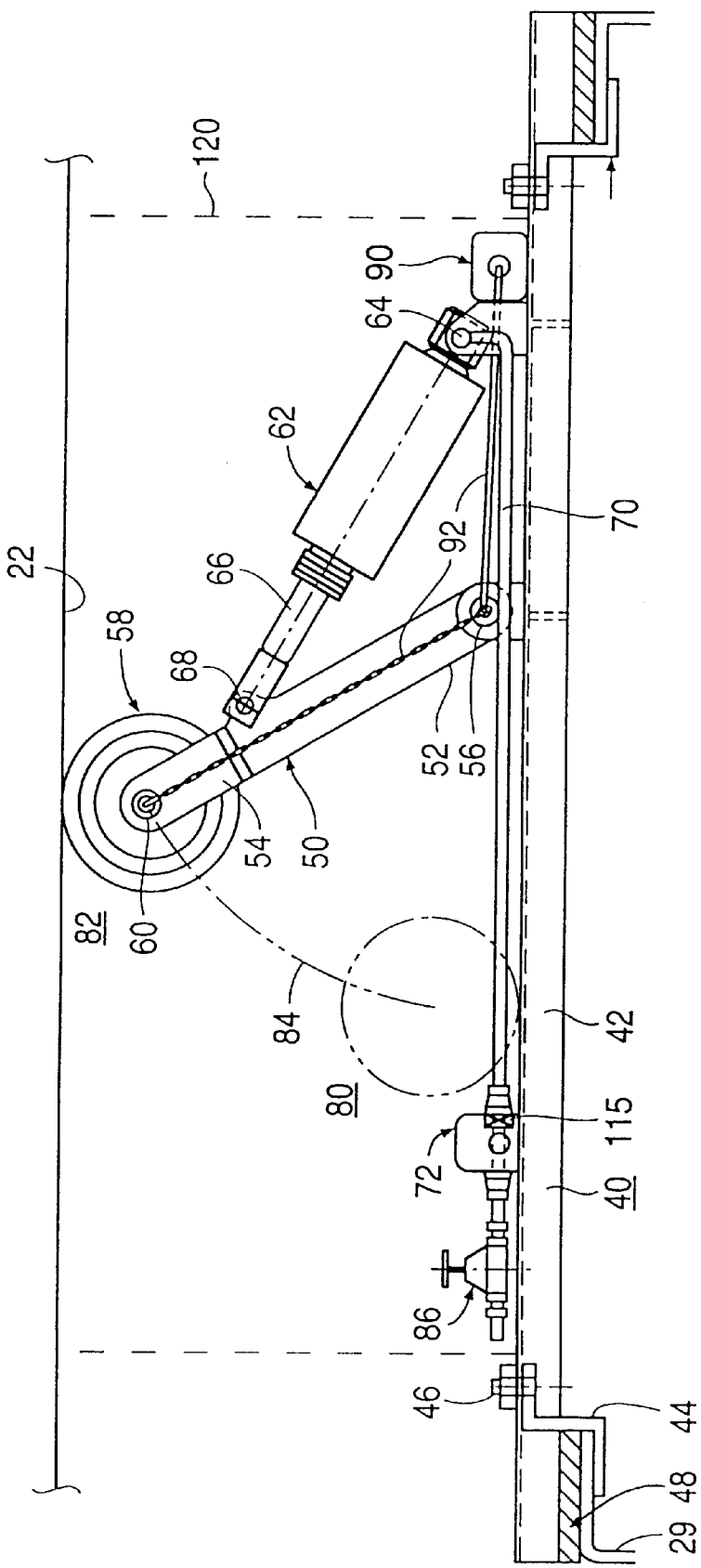
FIG. 2 is a side view of certain components of a mirror rotation assembly according to the present invention.

As further broadly depicted in FIG. 2, an elongated control arm 50 has a first end 52 and a second end 54. First end 52 attaches pivotally to support 40 at pivot point 56. A control wheel 58, preferably including a molded rubber tire having a maximum capacity of 400 psi, is rotatably mounted at pivot point 60 at second end 54 of control arm 50.

In accordance with the invention, a pivot assembly is provided to pivot the arm from a disengaged position proximate the chassis to an engaged position with the wheel in rolling contact with an underside of the trailer. As broadly depicted in FIG. 2, a cylinder 62, preferably a dual-action pneumatic cylinder, is pivotally connected to support 40 at pivot point 64. Piston rod 66 projects from cylinder 62, and is pivotally connected to control arm 50 at pivot point 68, intermediate first end 52 and second end 54.

As broadly embodied herein, pressurized fluid is provided to actuate cylinder 62 via fluid line 70. Preferably, 15 psig is supplied to cylinder 62 via the fluid line. In the preferred embodiment, the pressurized fluid is compressed air, preferably supplied by the vehicle's air compressor, via a solenoid control valve 72. This can be the same compressed air used in the vehicle brake system. However, it is within the scope of the invention to provide a separate pneumatic system to operate cylinder 62.

In accordance with the invention, control arm 50 and cylinder 62 are positioned on support 40 so that when cylinder 62 is pressurized, control arm 50 will be pivoted upward from a disengaged position 80 proximate the chassis, to an engaged position 82 with wheel 58 in rolling contact with the underside surface of trailer 22. Moreover, in accordance with the invention, these components are positioned so that the arc 84 defined by the arm's motion from disengaged position 80 to engaged position 82 is transverse to the axis 32 defined by the aligned tractor and trailer. The reason for this positioning will be apparent from the description of the operation of the invention given below.

It is also preferable that, when control arm 50 is in the engaged position 82, wheel 58 be maintained in substantially continuous rolling contact with the underside of trailer 22. This feature of the invention takes into account normal road conditions, which will cause trailer 22 to move up and down as the vehicle wheels encounter bumps in the road. In order to help maintain this substantially continuous contact, a regulator 86 preferably is provided in fluid line 70 to adjust the pressure in cylinder 62 as necessary to adjust the position of control arm 50 and keep control wheel 58 in contact with trailer 22. Preferably, regulator 86 will operate to maintain substantially constant pressure in cylinder 62.

Figure 3:
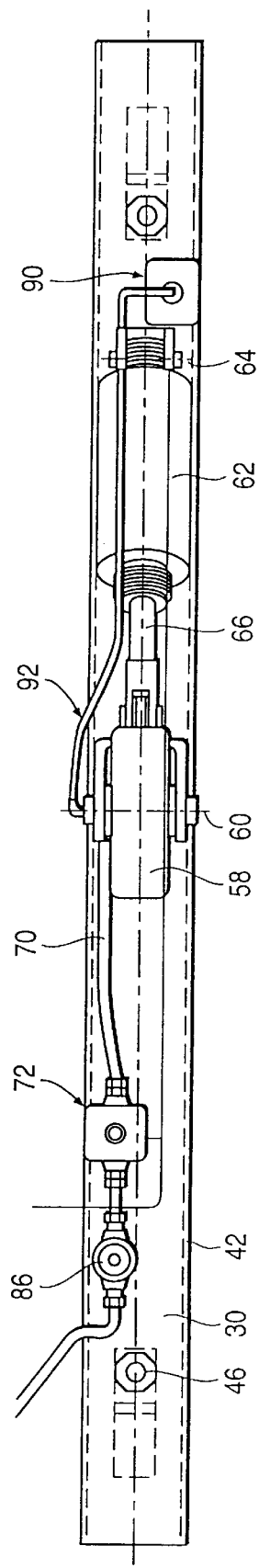
FIG. 3 is a top view of the mirror rotation assembly components depicted in FIG. 2.

In accordance with the invention, a counter is provided, operable to count a number of rotations or partial rotations of the wheel as the trailer pivots with respect to the tractor during a vehicle turn. As broadly depicted herein, and referring to FIGS. 2 and 3, an electronic counting mechanism 90 is attached to support 42. A rotatable cable 92, preferably a standard flex drive cable, links counting mechanism 90 to control wheel 58. Cable 92 can be, for example, a standard speedometer cable covered with a plastic sheath. As wheel 58 turns in response to a turn of the vehicle and corresponding pivot by the trailer about pivot point 26, cable 92 rotates in correspondence. The rotations or partial rotations of cable 92 in turn are converted in counter 90 into electronic pulses. Counter 90 counts these electronic pulses.

Another option for counting rotations of wheel 58, not shown in the drawings, is to place windows in the wheel 58, and mount a counter with a visual scan capability proximate the wheel to count the windows as they rotate past the counter.

Figure 4:
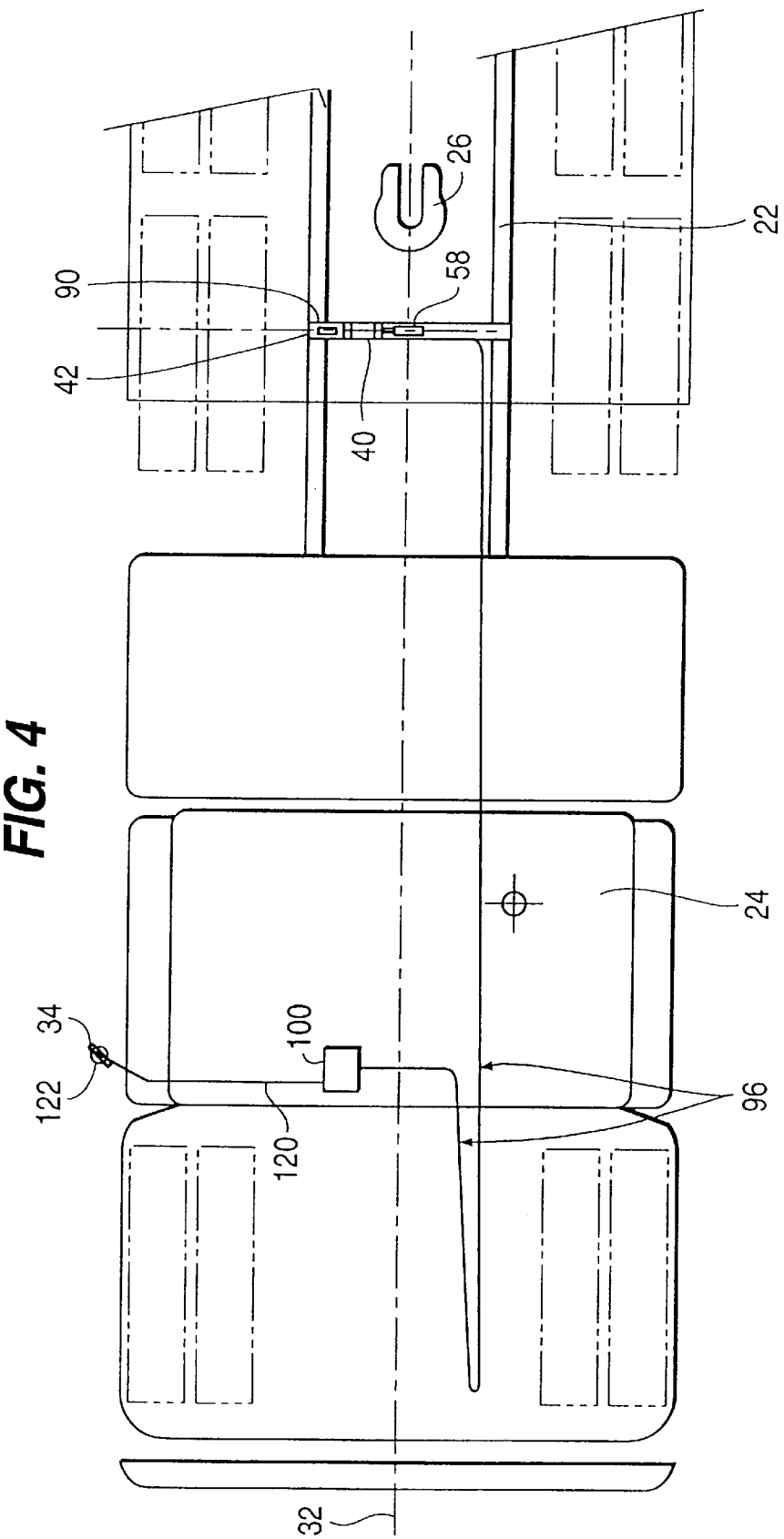
FIG. 4 is a top schematic view depicting the placement of a processor and wiring according to the present invention.
Figure 5:
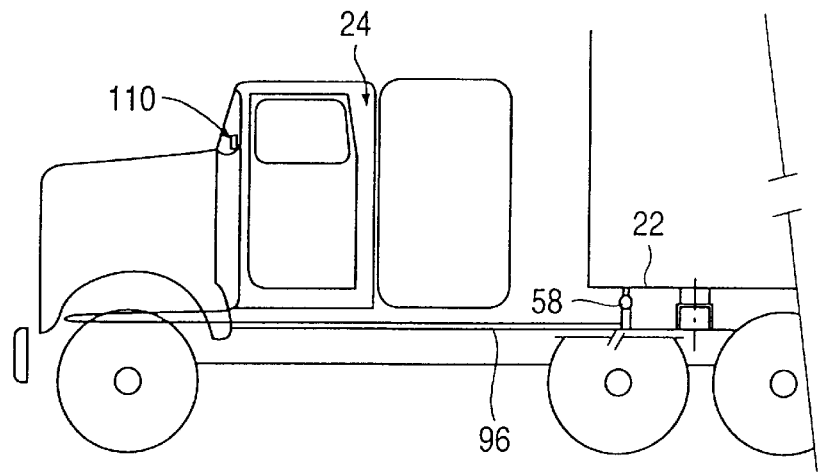
FIG. 5 is a side view of a vehicle tractor depicting placement of mirror rotation assembly components.

As broadly depicted in FIGS. 4 and 5, electronic counter 90 is connected electrically to processor 100 (described below) with wire 96 mounted in the chassis and running into the tractor. Electronic pulses from counter 90 travel via wire 96 to the processor. Although a wire is shown and described, other modes of transmitting a signal from the counter 90 to the processor also are contemplated and fall within the scope of the invention. For example, fiber optic cable, a radio transmitter, or other modes of signal transmission can be used.

In accordance with the invention, a motor is provided connectable to a rotatable mirror on the tractor, and a processor is programmed to receive the number of wheel rotations from the counter, calculate a degree of vehicle turn corresponding to the number of wheel rotations, calculate a degree of mirror rotation corresponding to the degree of vehicle turn, and instruct the motor to rotate the mirror according to the calculated degree of mirror rotation. As broadly depicted in FIGS. 4 and 5, a computer processor 100 is connected via wire 96 to counter 90, and mounted within tractor 24. Processor 100 receives the electronic pulses from counter 90. Processor 100 is programmed to calculate a degree of vehicle turn corresponding to the number of wheel rotations (i.e., electronic pulses) received from counter 90. Processor 100 then calculates an amount of mirror rotation, corresponding to the degree of vehicle turn, necessary to maintain a view of the passenger-side rear corner 36 of the trailer 22 within field of vision 38.

Figure 6:
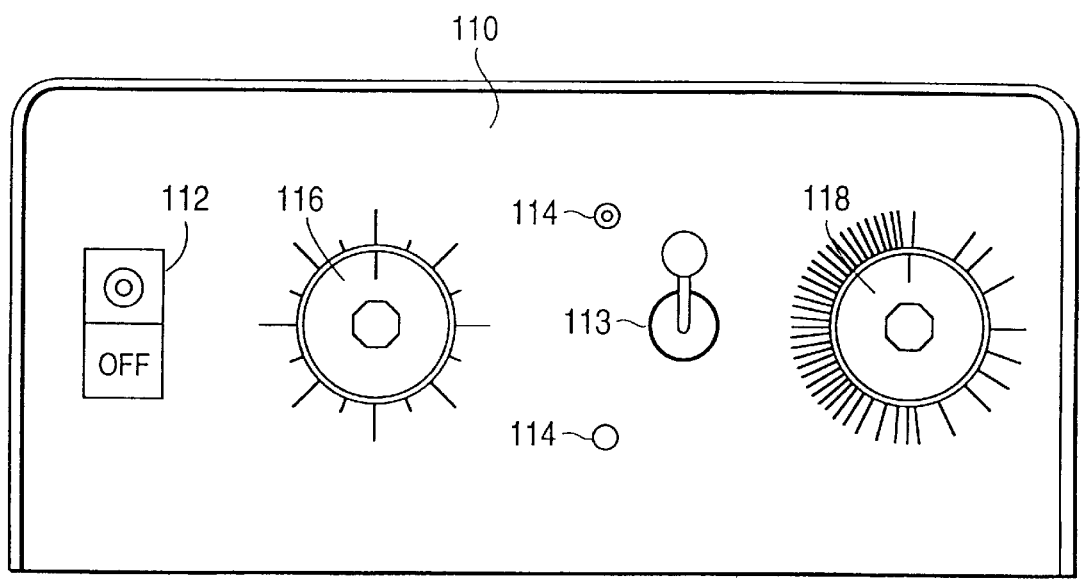
FIG. 6 is a front view of a control panel used with the present invention, located in the cab of the vehicle tractor.

In order for the system to operate effectively, certain information should be input to processor 100 prior to the vehicle turn. A control box 110, shown broadly in FIG. 6, preferably is mounted in the cab in a position allowing easy manipulation by the driver. In addition to an on/off switch 112, an active/inactive switch 113, and system indicia 114, control box 110 includes a mirror positioning control 116 and a calibration control 118. Power to control box 110 is supplied from the vehicle's normal 12V or 24V electrical system. The mirror positioning control 116 enables the driver to set the mirror 34 in the desired location to provide an acceptable field of vision 38, generally along an axis substantially parallel to axis 32. Calibration control 118 enables the driver to input the length of the trailer 22. Presetting the trailer length into the processor is critical to determine the proper amount of mirror rotation to retain an acceptable field of vision during the vehicle turn, because the amount of rotation needed will be a function of the trailer length.

Indicators 114 preferably include an "Active/Inactive" signal light to advise the driver when fluid pressure has been supplied to the cylinder and the control arm is engaged. The "Active" signal can be configured to light when pressure is supplied to the cylinder. It is preferred, however, that a limit switch 115 be provided proximate solenoid control valve 72, activated by pressure when wheel 58 comes in contact with trailer 22, and deactivated when wheel 58 no longer contacts trailer 22, to provide the driver a positive indication that the system actually is engaged and capable of operating.

Preferably, processor 100 is connected electrically via wire 120 to a motor 122 in mirror assembly 34. As was the case with the connection between counter 90 and processor 100, wire 120 can be replaced with an optical fiber, a radio transmitter, or another signal transmitter well-known in the art.

Figure 7:
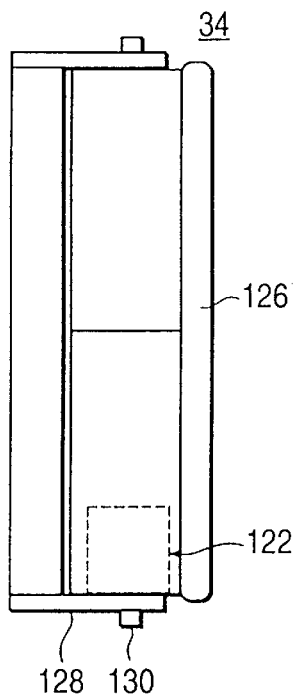
FIG. 7 is a side view of a mirror assembly used with the present invention.
Figure 8:
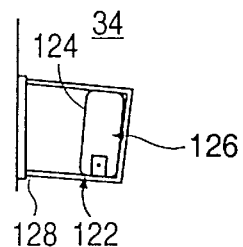
FIG. 8 is a front view of the mirror assembly shown in FIG. 7.
Figure 9:
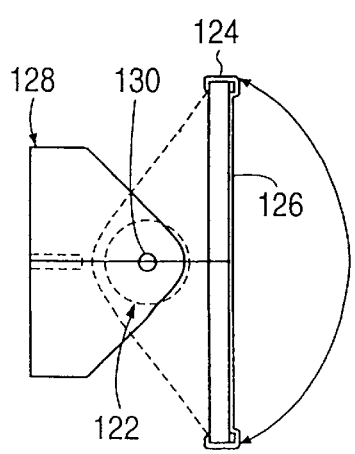
FIG. 9 is a top view of the mirror assembly shown in FIG. 7.

As broadly embodied in FIGS. 7 and 8, motor 122 is a servo-motor positioned within frame 124 of mirror assembly 34. Frame 124 and mirror face 126 are mounted pivotally on universal mounting bracket 128 and post 130. Motor 122 connects to mirror frame 124 via appropriate mechanical gearing and linkages (not shown), in order to rotate mirror frame 124 and face 126 about post 130.

Figure 10:
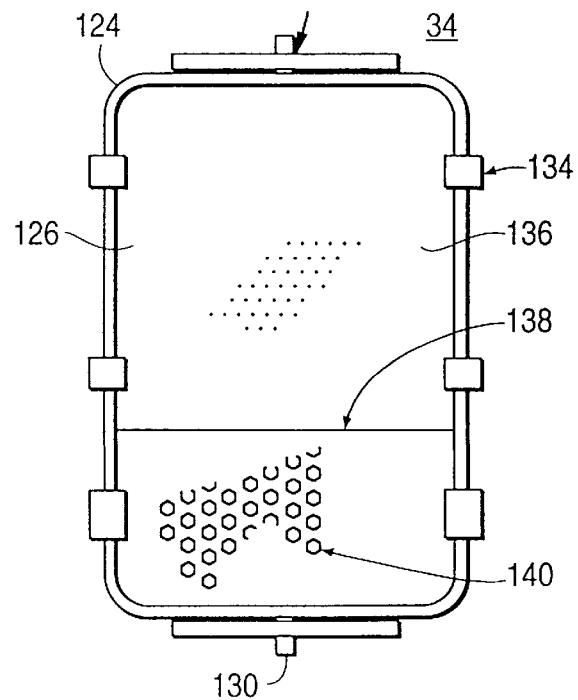
FIG. 10 is a detailed front view of a mirror assembly having a detachable mirror face, which can be used with the present invention.

It further is preferable that mirror assembly 34 be capable of providing varying optical capabilities to the driver. For this purpose, it is preferred that a plurality of clips 134 be provided in an opening of frame 124, and that a plurality of different mirror faces 126, each having different optical characteristics, e.g., a regular face mirror, a panoramic view mirror, a wide angle mirror, a convex mirror, a spot mirror, or the like, be provided. In addition, selected mirror faces 126 can have multiple optical characteristics. As broadly depicted in FIG. 10, mirror face comprises an upper portion 136, a dividing line 138, and a lower portion 140. Upper portion 136 and lower portion 140 have different optical characteristics. The driver can select the mirror face 126 appropriate for the driving to be done, and easily insert or remove mirror faces 126 by opening and closing clips 134.

Figure 11:
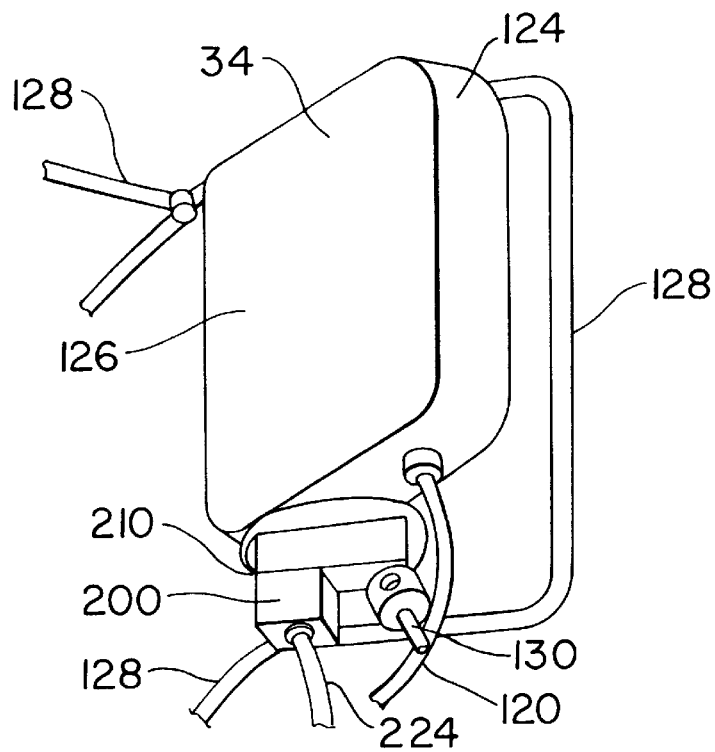
FIG. 11 is a perspective view of a mirror assembly with a position feedback device attached to the frame.
Figure 12:
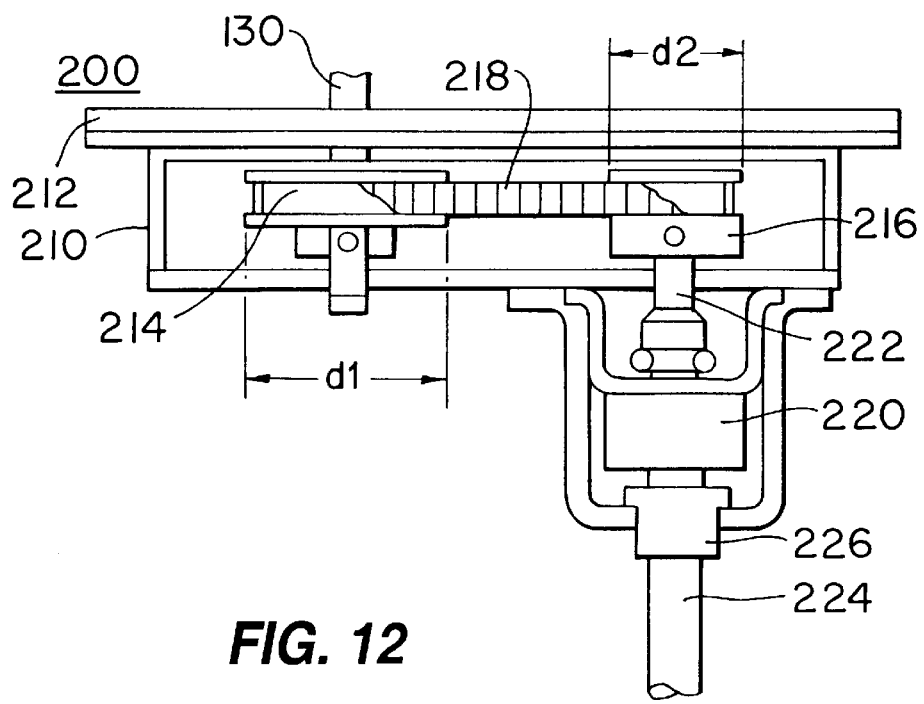
FIG. 12 is a cutaway side view of a mirror position feedback device in accordance with the invention.

The invention further comprises a mirror position feedback device 200, depicted in FIGS. 11 and 12.

The mirror position feedback device comprises a housing attachable to the frame of the mirror to be rotatable with the frame, the fixed shaft of the mirror projecting through the housing. Referring to FIGS. 11 and 12, a housing 210 is provided for housing the feedback components. The housing 210 preferably is open at the top, and includes a plastic or rubber seal 212 around the periphery of the opening. The housing preferably is configured to attach to frame 124 of the mirror on the bottom side, with fixed shaft 130 projecting through the housing 210. Because of this connection, the housing 210 will rotate with mirror frame 124 about the fixed shaft 130.

The mirror position feedback device further comprises a first pulley supported in the housing and fixedly attached to the fixed shaft. As shown in FIG. 12, a first pulley 214 is supported inside housing 210, and attached fixedly to fixed shaft 130. When attached, first pulley 214 will not rotate with the mirror frame 124 and housing 210. Instead, first pulley 214 will remain fixed in position.

The invention further comprises a second pulley supported in the housing to be rotatable with the housing and the mirror frame. Referring to FIG. 12, a second pulley 216 is supported within the housing 210, spaced from the first pulley 214. Second pulley 216 is supported so as to rotate with the housing 210, as mirror frame 124 rotates.

As shown in FIG. 12, first pulley 214 has a first selected diameter d1, and second pulley 216 has a second selected diameter d2. First diameter d1 is larger than second diameter d2. It is preferred that d1 be twice as large as d2, for the reasons explained below.

As broadly embodied herein, the mirror position feedback device comprises a timing belt extending between the two pulleys. Referring to FIG. 12, a timing belt 218 extends between first pulley 214 and second pulley 216.

The invention further comprises a potentiometer attached to the second pulley and rotatable with the second pulley. As shown in FIG. 12, a potentiometer 220 is fixed to second pulley 216 via a shaft 222. The potentiometer 220 calculates the actual amount of mirror rotation based on the amount of rotation of second pulley 216 and the amount of movement of timing belt 218. Potentiometer 220 can rotate a full 360°. The preferred 2:1 ratio of the first pulley diameter d1 to the second pulley diameter d2 means that for every 2° of rotation of second pulley 216 there will be 1° of rotation of the mirror frame 124. The potentiometer 220 measures the actual rotation.

A cable projects from the potentiometer and is attachable to a remote means for remotely controlling the mirror. As shown in FIGS. 11 and 12, a cable 224 projects through a grommet 226 and attaches to potentiometer 220. The other end of cable 224 is connected to processor 100. In this way, the actual degree of mirror rotation measured by the potentiometer 220 can be fed back to the system, and compared to the desired amount of mirror rotation based on the degree of vehicle turn. The processor 100 then can calculate whether additional mirror rotation is needed to ensure the driver can keep the rear passenger-side corner of the trailer 22 in his field of vision 38. The processor can vary the mirror rotation signal sent to mirror rotation motor 122 accordingly.

The mirror position feedback device described above is not limited for use with the mirror control assembly described herein. A similar mirror position feedback device can be attached to any remotely controlled vehicle mirror assembly.

The illustrated embodiment of the present invention operates as follows. After hooking up trailer 22 to fifth wheel 26, the driver manually sets support 40 to the proper position front to rear on chassis 30, and tightens down bolts 46. Entering the cab, the driver energizes the system with switch 112, sets the desired position of mirror assembly 34 with mirror positioning switch 116, and calibrates the system with calibration switch 118 by setting in the length of the trailer. Typically, the mirror position is set along an axis generally parallel with axis 32 defined by the tractor and trailer, thereby providing the driver with a view of the rear passenger-side corner 36 of the trailer.

After the system is energized with switch 112, the pneumatic cylinder is activated with switch 113. Solenoid-operated valve 72 opens and fluid pressure is provided via fluid line 70 to cylinder 62. Piston arm 66 retracts, pulling control arm 50 from disengaged position 80 to engaged position 82, with wheel 58 in rolling contact with the underside of trailer 22, along a line transverse to axis 32 defined by tractor 24 and trailer 22.

When the driver turns the vehicle, trailer 22 pivots with respect to tractor 24 about pivot point 26. As trailer 22 pivots, control wheel 58 turns, thereby rotating cable 92. As cable 92 rotates, the corresponding wheel rotations or partial rotations in the form of electronic pulses are counted by electronic counter 90. Electronic pulses then are transmitted to processor 100.

Processor 100 calculates a degree of vehicle turn corresponding to the counted rotations or partial rotations of control wheel 58. Already knowing the position of mirror assembly 36 and the length of trailer 22, processor 100 calculates a degree of mirror rotation corresponding to the degree of vehicle turn necessary to maintain the rear passenger corner of the trailer in the mirror's field of vision.

Figure 1C:
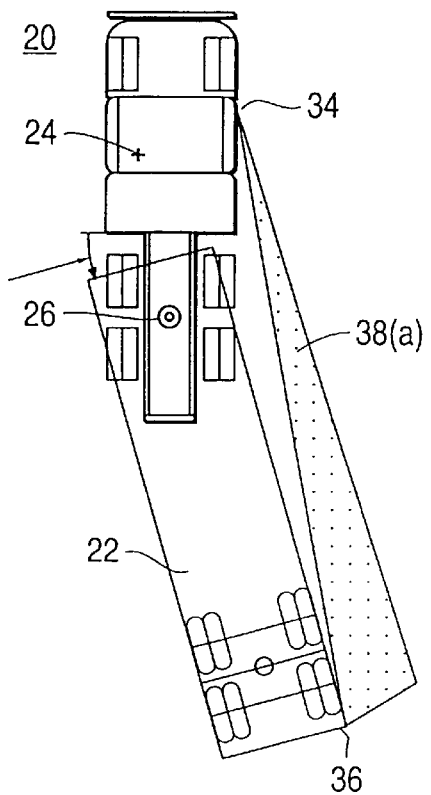
FIG. 1(c) is a top view of a tractor and semi-detached trailer including an automatically adjustable rear view mirror assembly according to the present invention, in which the driver retains the field of vision in the passenger-side rear view mirror during a vehicle turn.

Processor 100 transmits the calculated degree of mirror rotation to servo-motor 122. Servo-motor 122 rotates mirror face 126 in order to establish a field of vision 38(a) as shown in FIG. 1(c). The processor 100 receives feedback from the mirror portion feedback device in order to determine whether the active amount of rotation corresponds to the desired amount of rotation. If not, the processor 100 can vary the rotation signal accordingly to obtain the desired field of vision.

Likewise, when trailer 22 pivots back into alignment with tractor 24 at the end of the turn, wheel 58 rolls and cable 90 pivots in the opposite direction, resulting in a signal to rotate the mirror back to the original position, restoring original field of vision 38.

In this manner, the driver always can see the rear passenger-side corner of the trailer, even during a vehicle turn. Moreover, because regulator 86 maintains constant pressure in cylinder 62 as the trailer moves up and down, wheel 58 is kept in substantially continuous contact with the underside of trailer 22, even on rough roads. Preferably, when limit switch 115 is provided, the driver has continuous positive indication at control box 110 when wheel 58 is engaging the underside of trailer 22.

Modifications can be made to the above-described invention. For example, the presence of ice, slush, and salt on roads in northern climates can interfere with the operation of control arm 50 and wheel 58. In order to protect these components from the external environment, a detachable or permanent protective housing 120 (depicted broadly in FIG. 2) can be provided. The interchangeability of signal transmitting devices between counter and processor, and between processor and servo-motor, also has been discussed. The system can be provided only with a servo-motor to connect to an existing mirror assembly, or can be provided with its own rotatable mirror assembly to mount on the tractor. The mirror assembly itself can include a single mirror face, or a plurality of interchangeable mirror faces with varying optical characteristics. A separate power source and/or pressurized fluid source can be provided, or the system can operate from the vehicle's electrical system and/or high pressure air system. The control panel 110 also can be configured to enable the driver to de-energize the automatic mirror rotation capability and take direct control of mirror rotation.

Additionally, although the invention has been described with respect to a passenger-side mirror on the right-hand side of the vehicle, it can also be configured to work with the driver's-side mirror assembly, or with a passenger-side mirror on the left-hand side of the vehicle for use in countries where drivers drive on the right side of the road.

Additional modifications readily will occur to those skilled in the art. For example, in order to work with trailers lacking a smooth underside surface, e.g., fuel tankers, car carriers, or ten and twenty-yard dirt haulers, a flat steel plate can be mounted on the front end trailer underside for wheel 58 to roll against. Such modifications are well within the skill level of persons of ordinary skill.

The invention in its broader aspects, therefore, is not limited to the specific details and embodiments described above or shown in the drawings. Departures may be made from such details without departing from the spirit or scope of the invention.

I claim:

1. A mirror rotation assembly for a vehicle having a tractor and a pivotally connected semi-detached trailer, the assembly comprising:

an elongated arm having first and second ends, the first end pivotally mountable to a support on a chassis of the tractor with the arm generally transverse to an axis defined by the tractor and the trailer, the second end supporting a rotatable wheel;

a pivot assembly connected to the arm and connectable to the chassis, and configured to pivot the arm from a disengaged position proximate the chassis to an engaged position with the wheel in rolling contact with an underside of the trailer;

a counter operable to count a number of rotations or partial rotations of the wheel as the trailer pivots with respect to the tractor during a vehicle turn and transmit the counted number of rotations or partial rotations;

a motor connectable to a rotatable mirror on the tractor;

a processor electrically connected to the motor, programmed to receive the number of wheel rotations or partial rotations transmitted by the counter, calculate a degree of vehicle turn corresponding to the number of wheel rotations or partial rotations, calculate a degree of mirror rotation corresponding to the degree of vehicle turn, and instruct the motor to rotate the mirror according to the calculated degree of mirror rotation; and a mirror position feedback device attached to the mirror and electrically connected to the processor for feeding back to the processor an actual degree of mirror rotation.

2. A mirror rotation assembly according to claim 1, wherein the mirror position feedback device comprises:

a housing attached to a frame of the mirror to be rotatable with the frame, a fixed shaft of the mirror projecting through the housing;

a first pulley supported in the housing and fixedly attached to the fixed shaft;

a second pulley supported in the housing to be rotatable with the housing and the frame of the mirror;

a timing belt extending between the two pulleys;

a potentiometer attached to the second pulley and rotatable with the second pulley; and a cable projecting from the potentiometer and attached to the processor.

3. A mirror rotation assembly for a vehicle having a tractor and a pivotally connected semi-detached trailer, the assembly comprising:

a rotatable wheel;

means on the tractor for supporting the rotatable wheel and for moving the rotatable wheel in and out of engagement with a bottom surface of the trailer;

a counter operable to count, when the wheel is in engagement with the trailer, a number of rotations or partial rotations of the wheel as the trailer pivots with respect to the tractor during a vehicle turn and transmit the counted number of rotations or partial rotations;

a rotatable mirror assembly, including a mirror, on the tractor;

a motor connectable to the mirror assembly;

a processor electrically connected to the motor, programmed to receive the number of wheel rotations or partial rotations transmitted by the counter, calculate a degree of vehicle turn corresponding to the number of wheel rotations or partial rotations, calculate a degree of mirror rotation corresponding to the degree of vehicle turn, and instruct the motor to rotate the mirror according to the calculated degree of mirror rotation; and a mirror position feedback device attached to the mirror and electrically connected to the processor for feeding back to the processor an actual degree of mirror rotation.

4. A mirror rotation assembly according to claim 3, wherein the mirror position feedback device comprises:

a housing attached to a frame of the mirror assembly to be rotatable with the frame, a fixed shaft of the mirror projecting through the housing;

a first pulley supported in the housing and fixedly attached to the fixed shaft;

a second pulley supported in the housing to be rotatable with the housing and the frame of the mirror;

a timing belt extending between the two pulleys;

a potentiometer attached to the second pulley and rotatable with the second pulley; and a cable projecting from the potentiometer and attached to the processor.

5. A mirror rotation assembly according to claim 3, wherein the mirror position feedback device comprises:

a housing attachable to a frame of the mirror assembly to be rotatable with the mirror assembly, such that a fixed shaft of the mirror projects through the housing;

a first pulley supported in the housing and fixedly attachable to the fixed shaft;

a second pulley supported in the housing to be rotatable with the housing and the mirror assembly;

a timing belt extending between the two pulleys;

a potentiometer attached to the second pulley and rotatable with the second pulley; and a transmission means for transmitting information related to the mirror assembly rotation from a potentiometer to a remote means for controlling the mirror assembly.

6. A mirror rotation assembly according to claim 5, wherein the transmission means includes a cable.

7. A mirror rotation assembly according to claim 3, wherein the mirror position feedback device comprises:

a housing attachable to the mirror assembly to be rotatable with the mirror assembly;

a sensing means supported in the housing for sensing an amount of rotation of the mirror assembly, the sensing means including a potentiometer rotatable in an amount proportional to the amount of rotation of the mirror assembly; and transmitting means supported by the housing for transmitting the amount of mirror assembly rotation to a remote means for controlling the mirror assembly.

8. A mirror rotation assembly according to claim 7, wherein the transmitting means includes a cable.

9. A mirror rotation assembly according to claim 7, wherein the sensing means includes a first fixed pulley and a second pulley rotatable with the mirror assembly, and a timing belt coupling the two pulleys, the potentiometer being rotatable with the second pulley.

10. A mirror rotation assembly according to claim 9, wherein the potentiometer calculates the amount of mirror assembly rotation based on an amount of rotation of the second pulley and movement of the timing belt.

11. A mirror rotation assembly according to claim 9, wherein the first pulley has a first diameter and the second pulley has a second diameter greater than the first diameter.

12. A mirror rotation assembly according to claim 11, wherein the second diameter is approximately two times the first diameter.

* * * * *